United States Patent [19]

Schäty

[11] Patent Number: 4,541,153

[45] Date of Patent: Sep. 17, 1985

[54] MOUNTING CLIP

[75] Inventor: Harold Schäty, Wetzlar, Fed. Rep. of Germany

[73] Assignee: USM Corporation, Farmington, Conn.

[21] Appl. No.: 577,585

[22] Filed: Feb. 6, 1984

[30] Foreign Application Priority Data

Feb. 8, 1983 [DE] Fed. Rep. of Germany ... 8303422[U]

[51] Int. Cl.⁴ .............................................. E04B 1/38
[52] U.S. Cl. ....................................... 24/305; 24/336; 24/664; 248/73; 411/437; 411/508
[58] Field of Search ................. 24/305, 336, 347, 664, 24/679, 700, 580, 584, 598, 662, 585; 248/73, 219.2, 221.4; 411/437, 508, 509, 510

[56] References Cited

U.S. PATENT DOCUMENTS 3,313,083 4/1967 Flora .............................. 248/73 X

FOREIGN PATENT DOCUMENTS 912009 4/1946 France .............................. 411/437

Primary Examiner—William E. Lyddane
Assistant Examiner—Laurie Cranmer
Attorney, Agent, or Firm—Aubrey C. Brine

[57] ABSTRACT

A mounting clip is provided for pressing onto a weld stud having ridges extending radially outwardly therefrom. The clip is provided with a box for accommodating the stud. A frame is provided on the top of the stud receiving box which provides wall structure for supporting a pair of detents, which wall structure is designed to be flexible, allowing the detents considerable freedom of movement.

3 Claims, 5 Drawing Figures

MOUNTING CLIP

BACKGROUND OF THE INVENTION

The present invention relates to a mounting clip for pressing onto a stud, in particular a weld stud, provided with the ridges extending radially in the main, which clip is provided with a box containing a hole for accommodating the stud, with two resilient fingers projecting from the box walls at opposite ends and with two detents staggered at 90° in relation to the resilient fingers.

A mounting clip of that similar to the present clip is shown in German reference DE-OS No. 27 44 294. The relatively sturdy box on this mounting clip, which gives the mounting clip its inner stability, determines the flexibility imparted to the resilient fingers and above all to the detents, the flexibility of which is limited however, due to the necessary inner rigidity of the box. The object of the invention is therefore to improve the above referred to mounting clip to such an extent, that improved conditions are provided for developing the flexibility of the resilient fingers, and the detents.

SUMMARY OF THE INVENTION

The above object is achieved by providing a frame placed on top of the box, inside of which opening extending perpendicular to the centre of the hole lie the two resilient fingers and from which frame walls projecting from the box extend inwardly of the detents for engaging the back of a ridge, wherein the frame walls are of such a flexibility, as to allow the detents to ride over the ridges of the stud when the clip is pressed onto the latter.

Due to the frame being affixed onto the top of the box, there is thus provided supports for the detents in the form of the frame walls projecting from the box, which supports, without exerting an appreciable influence on the box, can be designed to be so flexible, as to yield outwardly under adequate elasticity when the clip is pressed onto the stud, by which the detents are allowed a considerable freedom of movement, which enables the detents then to engage relatively deep into the interstices of the ridges. The frame thereby provides a certain protection for the resilient fingers, which consequently can be provided with considerable flexibility without running the risk that the resilient fingers can be pulled off the stud by undesired outside interference. The opening in the frame, in which the resilient fingers are situated, at the same time, permits the mounting clip to be made with ease by plastic injection molding, since the opening in the frame allows for the positioning of respective sliding elements in the molding tool, so that no undercuts are produced, which could render demolding process very difficult, or even impossible.

The desirable flexibility of the resilient fingers can above all be favorably attained in that the walls of the box bearing the resilient fingers are designed flexible in the region of their blending into the respective resilient finger.

Additionally, the frame can be used expediently as a stop for the inserted stud in that a stop is formed by the top of the frame lying opposite the box.

BRIEF DESCRIPTION OF THE DRAWINGS

An exemplary embodiment of the clip is illustrated in the drawing, wherein.

DESCRIPTION OF A PREFERRED EMBODIMENT

Figure 1:
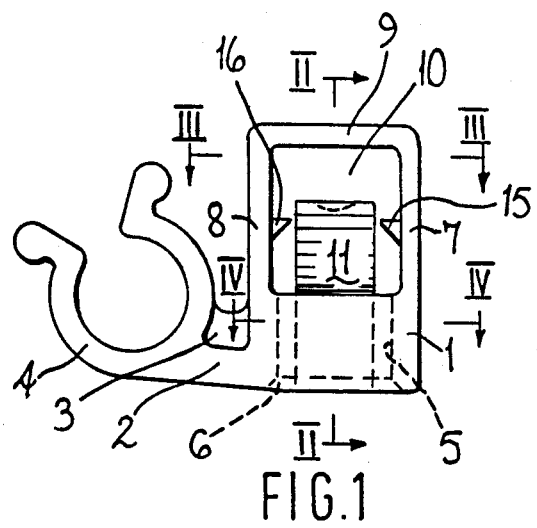
FIG. 1 shows the mounting clip in side elevation.

The mounting clip shown in FIG. 1 comprises a box 1, onto which a tube adaptor 4 is attached by means of a web 2 together with a reinforcement 3. The tube adaptor 4, is of known design and will not be described in further detail as its particular structure is of no importance to the present invention. Thus, any other receptive element or such like could be attached to the box 1 as well, in place of the tube adaptor 4. The box 1 in cross-section is externally of rectangular shape and is provided at its centre with a hole 5, which is sunk into the box 1 by way of a funnel-shaped outward opening 6. The hole 5 serves the purpose of accommodating a stud provided with radially-extending ridges, such as that described for example in the German reference DE-AS No. 1 475 035. The hole 5 is of such a diameter, as to allow the box 1 to be pressed easily onto such a stud.

Onto the top of the box 1 is mounted a frame made up of frame walls 7 and 8, and a top wall 9. Into an opening 10 of the frame 7, 8, 9 there projects a pair of resilient fingers 11 and 12, the opening 10 extending perpendicular to the axis of the hole 5. The two resilient fingers 11 and 12 are consequently covered, to a large extent by the frame walls 7 and 8 lying at either side of them, so that an undesired external interference of the resilient fingers 11 and 12, e.g. by cleaning rags, tools and suchlike, is practically impossible. The resilient fingers 11 and 12 can therefore be provided with considerable flexibility. This flexibility can particularly be brought about by designing the wall of the box 1 in the region of the hinges 13 and 14 respectively tapered, if possible, which is indicated by the dotted lines in the drawing.

A pair of detents 15 and 16 projects inwardly from the walls 7 and 8, and are allowed to deflect in that the frame walls 7 and 8 yield accordingly when the clip is pressed onto the stud, which results in the detents 15 and 16 riding over the ridges of the stud. The detents 15 and 16 may thus be designed short and rigid, since the necessary flexibility is imparted to them by the frame walls 7 and 8. The top forming part 9 of the frame can be used for the purpose of providing a stop for the inserted stud, which in this case abuts against the top 9 with its front face. By this means it is possible—with the stud being of specific length—to set the mounting clip in a defined position in relation to the base of the stud. Such studs are normally designed as weld studs and welded to supports, e.g. car-body panels. In such a case, the top 9 would ensure that the box 1 is kept at a certain distance from the car-body panel in line with the length of the stud. At the same time, the top 9 stablizes the frame walls 7 and 8.

Figure 2:
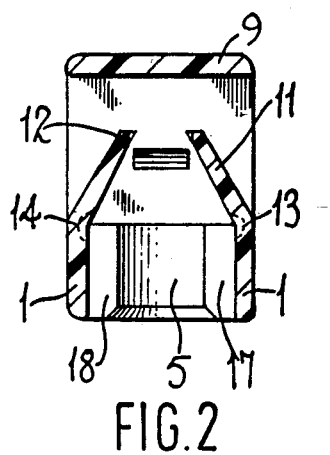
FIG. 2 shows the box and the frame of the clip of FIG. 1 in cross-section taken on the line II—II of FIG. 1.
Figure 3:
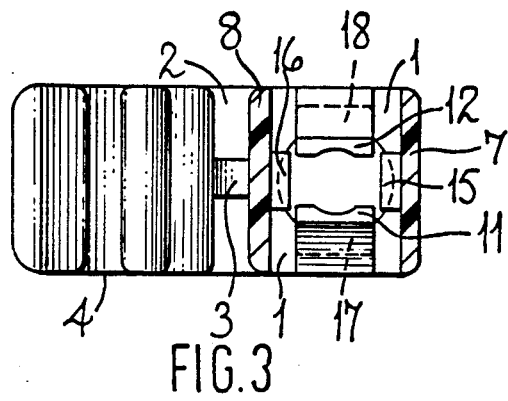
FIG. 3 shows the clip of FIG. 1 in top view, showing the frame in cross-section taken on the line III—III of FIG. 1.
Figure 4:
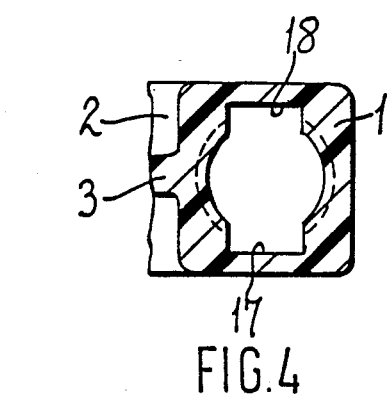
FIG. 4 shows the clip of FIG. 1 in cross-section taken on the line IV—IV of FIG. 1.

With particular reference to FIGS. 2, 3 and 4 it can be seen that a pair of axially-extending cut-outs 17 and 18 are formed below the resilient fingers 11 and 12, which cut-outs enlarge the hole 5 outwardly to such an extent, that free gaps below the resilient fingers 11 and 12 are created, through which respective projections present in an injection mold, may be extended so that the resilient fingers 11 and 12 can be formed at their side facing the box 1 by the injection molding process.

Figure 5:
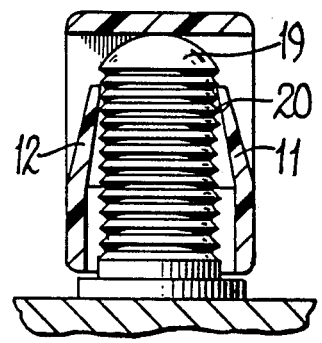
FIG. 5 shows the clip of FIG. 1, pressed onto a stud.

In FIG. 5 there is shown a mounting clip together with an inserted stud 19, whereby the illustrated clip corresponds with the one shown in FIG. 2. The stud 19 is provided with ridges 20, the undersides of which have engaged the resilient fingers 11 and 12.

I claim:

1. A plastic mounting clip for pressing onto a stud having ridges extending radially therefrom, said clip comprising a plurality of walls forming a box, said box having a hole formed therein for accommodating a stud, a pair of opposed flexible walls each extending from the top of one of two opposed walls of said box walls axially with respect to said hole and connected by a top wall to provide a frame forming an opening between said box and said top wall, a pair of opposed resilient fingers each extending upwardly from the top of one of two other opposed walls of said box walls and into said frame opening for engagement with the ridges on a stud extending through said hole and a pair of substantially rigid detents located on and projecting inwardly from said frame walls for engaging the ridges on a stud extending through said hole, said frame walls being of a flexibility to allow said detents to ride over the ridges of a stud when the clip is pressed onto a stud.

2. A mounting clip according to claim 1, characterized in that each of said walls of said box bearing the resilient fingers is flexible in the region of its connection to the respective resilient finger.

3. A mounting clip according to claim 1, characterized in that the top wall of the frame opposite the box forms a stop for a stud inserted into said opening.

* * * * *